May 26, 1925.
L. B. MORTON
1,539,322
APPARATUS FOR MAKING PHOTOGRAPHIC ENLARGEMENTS
Original Filed May 2, 1923
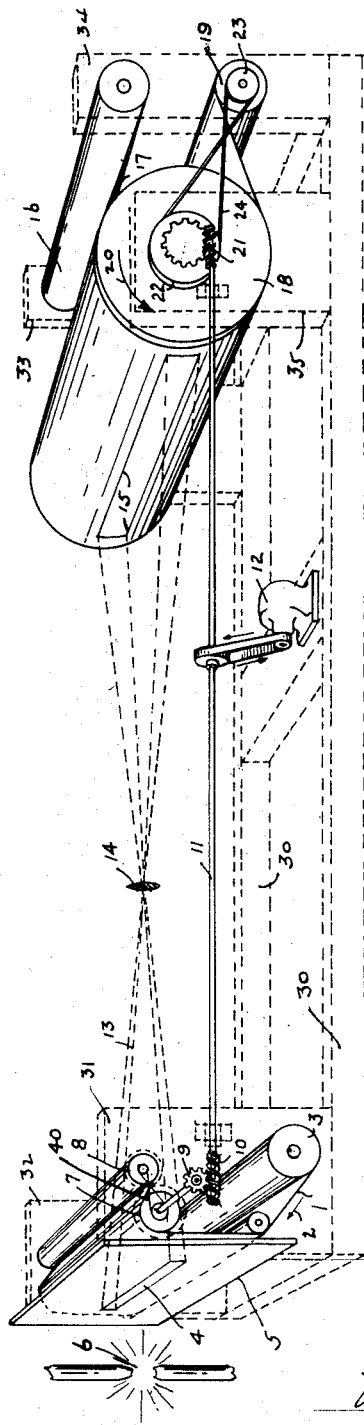
Lawrence B. Morton
INVENTOR.
BY
Miller Henry & Boykin
ATTORNEYS Patented May 26, 1925.

1,539,322

UNITED STATES PATENT OFFICE.

LAWRENCE B. MORTON, OF SAN FRANCISCO, CALIFORNIA.

APPARATUS FOR MAKING PHOTOGRAPHIC ENLARGEMENTS.

Application filed May 2, 1923, Serial No. 636,096. Renewed March 30, 1925.

*To all whom it may concern:*

Be it known that I, LAWRENCE B. MORTON, a citizen of the United States, and resident of the city and county of San Francisco, State of California, have invented new and useful Improvements in Apparatus for Making Photographic Enlargements, of which the following is a specification.

My invention has for its object a simple and effective apparatus whereby enlargements may be made from a relatively long film negative by projecting the same upon an elongated strip of sensitive paper, the ratio of time and distance traveled by the film and paper being maintained constant throughout the exposure.

My invention is characterized by simplicity in the apparatus whereby greater accuracy and efficiency is attained. Other advantages will be apparent from a study of the drawings and specification which follow.

Referring to the accompanying drawing, a strip of film as the negative produced in the well known panoramic camera is indicated at 1, adapted to travel in the direction of the arrow 2 from the roll 3 by the action of power means to be described below. During the advance of the film 1 it passes across the slot 4 in the screen 5 at which time the said film comes within the light beam emanating from the light source 6 and passing through the slot 4. The film thereafter passes over the roller 7 and is wound upon the roller 8. Suitable gear connections are indicated at 9 and 10 actuated by the shaft 11 from the motor 12. The rollers 3, and 7 are spaced apart whereby the light beam passing through the slot 4 and film 1 passes out as indicated by the rays 13 through the lens 14 and produces an enlarged image as indicated at 15.

The receiving end of my apparatus is provided with a roll of sensitized paper at 16 from which the paper strip 17 is passed over the roller 18. This roller is of relatively large diameter whereby the enlarged image 15 to all intents and purposes is not distorted by the curvature of the roll from that of a flat surface. I have found that a 16-inch roller is well adapted to enlargements of 8 times from an ordinary panoramic film negative.

After passing over the roller 18 the paper strip is wound upon the receiving roller 19 from which it is to be subsequently removed for development and fixing. The roller 18 is caused to rotate in the direction of the arrow 20 by the power means 12 and shaft 11 acting through any conventional gearing as 21. The ratio of the travel of the roller 18 in the direction 20 bearing the same ratio to the advancement of the film 1 as the enlargement 15 bears to the image of the slot 4 on the film 1. Therefore the image of any point from the film 1 falling upon the paper 17 within the enlarged area 15 will travel exactly with the paper causing the chemical action on the paper 17 to be progressive for a constant image during the whole period of the travel of the image; that is, the image will travel exactly with the paper; and while I have not shown change gears at 9, 10, and 21, they are well known, and any form of gearing or belt drive or equivalent may be employed, whereby the desired ratios of speed for the rollers 7 and 18 are attained.

At 22 and 23 are shown band wheels and at 24 a driving belt and I prefer to make the speed ratio of the periphery of the roller 19 slightly greater than the roller 18, maintaining the belt 24 sufficiently loose on its pulleys 22 and 23 to enable a slight slipping backward to occur of the roller 19. In other words, I prefer to maintain a slight over-speeding tendency in the roller 19, to insure a taut paper surface at all times upon the roller 18 and this is accomplished by making the pulley 23 slightly smaller or the pulley 22 slightly larger than the ratio between the diameters of the rollers 19 and 18.

The speed of the paper strip 17 is at all times established and maintained by the rate of travel of the roller 18 as indicated by the arrow 20 just as the rate of travel of the film 1 in the direction of the arrow 2 is established and maintained by the roller 7.

The drawing is somewhat diagrammatic for the purpose of better bringing out the operating features of the apparatus and it is to be understood that the parts above described are to be mounted in any suitable frame work 30 having conventional bearings for the rollers mounted on supports as 31, 32, 33, 34, 35.

I am well aware that apparatus has heretofore been employed for making enlargements wherein the sensitized strip 17 is caused to travel over a flat surface traveling between a plurality of rollers. In my apparatus, however, I employ a single roller upon the surface of which the paper is stretched and against whose cylindrical surface the enlarged image is produced. I thereby obtain a smaller and more compact machine in which the driving power is reduced and the accuracy of maintaining the image on the moving paper is increased resulting in a very superior enlargement.

The rollers 7 and 18 control the rate of travel of the film and the paper and the winding rolls 8 and 19 are urged by their driving means to a slightly greater peripheral speed, this they are prevented from doing, however, by the tension in the film 1 and in the paper 17 and the belts 24 and 40 therefore are constantly slipping very slightly.

While I have shown supply and winding rollers 16 and 19 for the paper it will be understood that these will not be necessary where the length of the paper used is not greater than the periphery of the large exposure roller 18, the paper in such case being wound entirely on said periphery. Or the utilized paper or film may be otherwise cared for.

In commercial photographic work it will frequently be found advisable to make the said exposure roller of large diameter for that purpose, a roller of sixteen inches diameter being suitable for a 48-inch enlargement.

I claim:

1. Enlarging apparatus comprising a driving roller and a guide between which a film is adapted to be advanced, a light slot adjacent said advancing film, a lens positioned to establish the image of the film, a cylinder to receive the image projected by the lens and adapted to carry a strip of sensitive paper and a common power means and driving connections therefrom to the film and the cylinder, said connections constructed and adapted to advance the film and the paper in opposite directions and at rates of speed proportional to the degree of the enlargement and a roller to receive the utilized film and another roller for receiving the exposed paper, and means having a slipping relation actuated from said driving connections to wind the paper and hold it tight against the cylinder.

2. Enlarging apparatus comprising parts as set forth in claim 1 and other means having a slipping relation and actuated from the other driving connections to wind the film and hold it stretched across the slot.

LAWRENCE B. MORTON.